(12) United States Patent
Kurita et al.

(10) Patent No.: US 11,498,120 B2
(45) Date of Patent: Nov. 15, 2022

(54) MOLDING APPARATUS AND METHOD FOR MOLDING USING SAME

(71) Applicant: Kabushiki Kaisha F.C.C., Hamamatsu (JP)

(72) Inventors: Yukinori Kurita, Hamamatsu (JP); Makoto Kambara, Hamamatsu (JP)

(73) Assignee: Kabushiki Kaisha F.C.C., Hamamatsu (JP)

( * ) Notice: Subject to any disclaimer, the term of this patent is extended or adjusted under 35 U.S.C. 154(b) by 0 days.

(21) Appl. No.: 17/214,890

(22) Filed: Mar. 28, 2021

(65) Prior Publication Data

US 2021/0213519 A1  Jul. 15, 2021

Related U.S. Application Data

(63) Continuation of application No. PCT/JP2019/039516, filed on Oct. 7, 2019.

(30) Foreign Application Priority Data

Oct. 9, 2018  (JP) .............................. JP2018-191231

(51) Int. Cl.
*B22D 17/22* (2006.01)
*B22C 9/06* (2006.01)

(52) U.S. Cl.
CPC ................................ *B22D 17/2263* (2013.01)

(58) Field of Classification Search
CPC ...... B22C 9/06; B22D 17/22; B22D 17/2263; B29C 33/10
USPC .................................. 164/271, 342, 47, 137
See application file for complete search history.

(56) References Cited

U.S. PATENT DOCUMENTS 8,424,587 B1 *  4/2013  Dubay ................... B29C 45/34
                                                                   164/305

FOREIGN PATENT DOCUMENTS

| CN | 205996155 U | * | 3/2017 | ............. B22D 17/20 |
| JP | H08-290232 A | | 11/1996 | |
| JP | 2007-38454 A | | 2/2007 | |
| JP | 2008080391 A | | 4/2008 | |

OTHER PUBLICATIONS

Machine translation of CN 205996155 U (Year: 2017).*
International Search Report and Written Opinion of the International Searching Authority, issued in PCT/JP2019/039516, dated Dec. 24, 2019; ISA/JP.

\* cited by examiner

*Primary Examiner* — Kevin P Kerns
(74) *Attorney, Agent, or Firm* — Harness, Dickey & Pierce, P.L.C.

(57) ABSTRACT

A molding apparatus for obtaining an annular molded article has a fixed die D1 and a movable die D2 capable of forming an annular cavity C. A first block B1 and a second block B2 are formed inside the cavity C in the fixed and movable dies D1 and D2. The blocks form a flow channel R communicating with the cavity C. Thus, gas generated in the cavity C and a molten metal can flow in the flow channel R. A discharge hole B2*b* is formed in the second block B2 to discharge the gas flowing in the flow channel R to the outside. A forming surface of the flow channel R, in the first and second blocks B1 and B2, is formed in an outer circumferential shape following an inner circumferential shape of the cavity C.

10 Claims, 14 Drawing Sheets

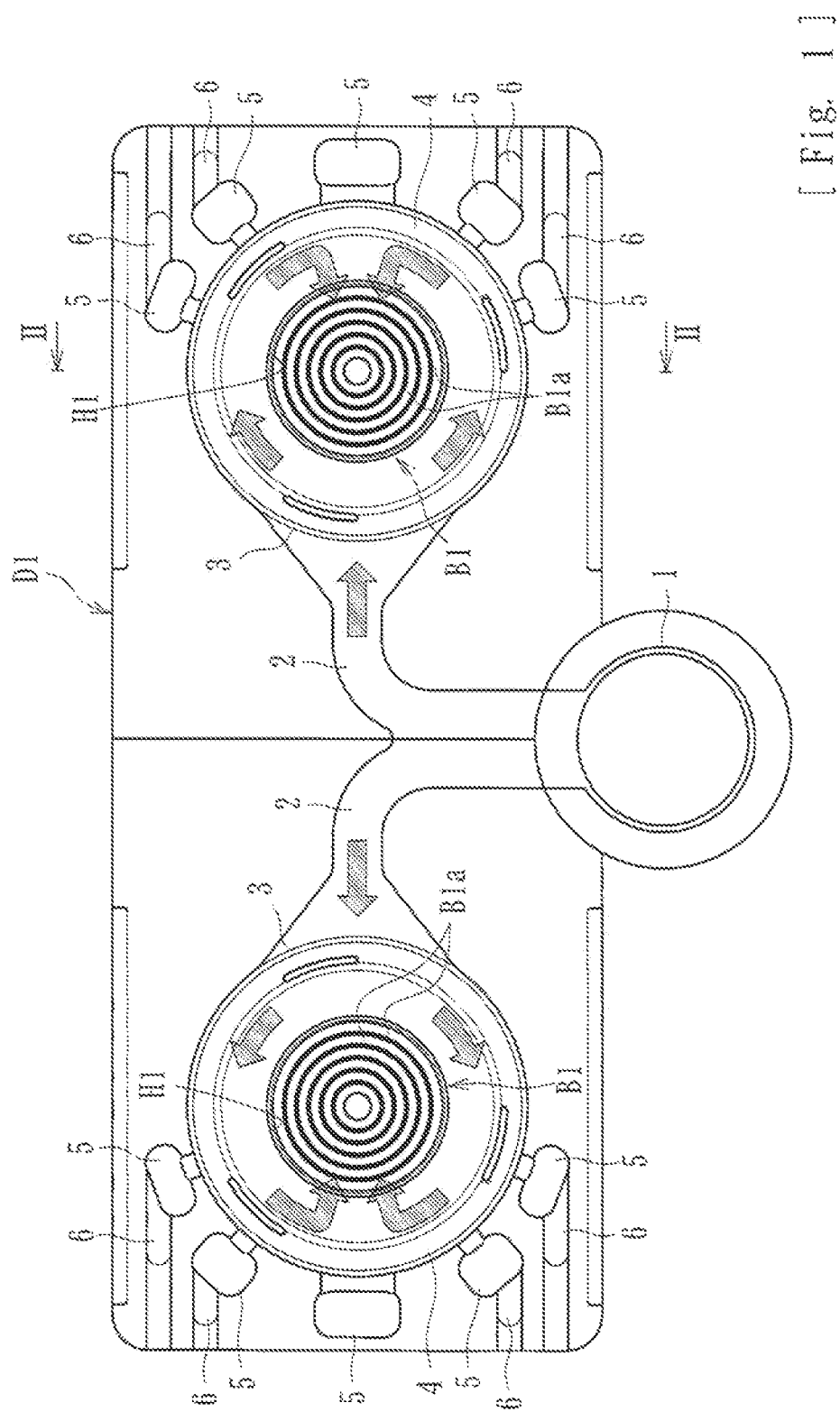
[Fig. 1]

[Fig. 2]
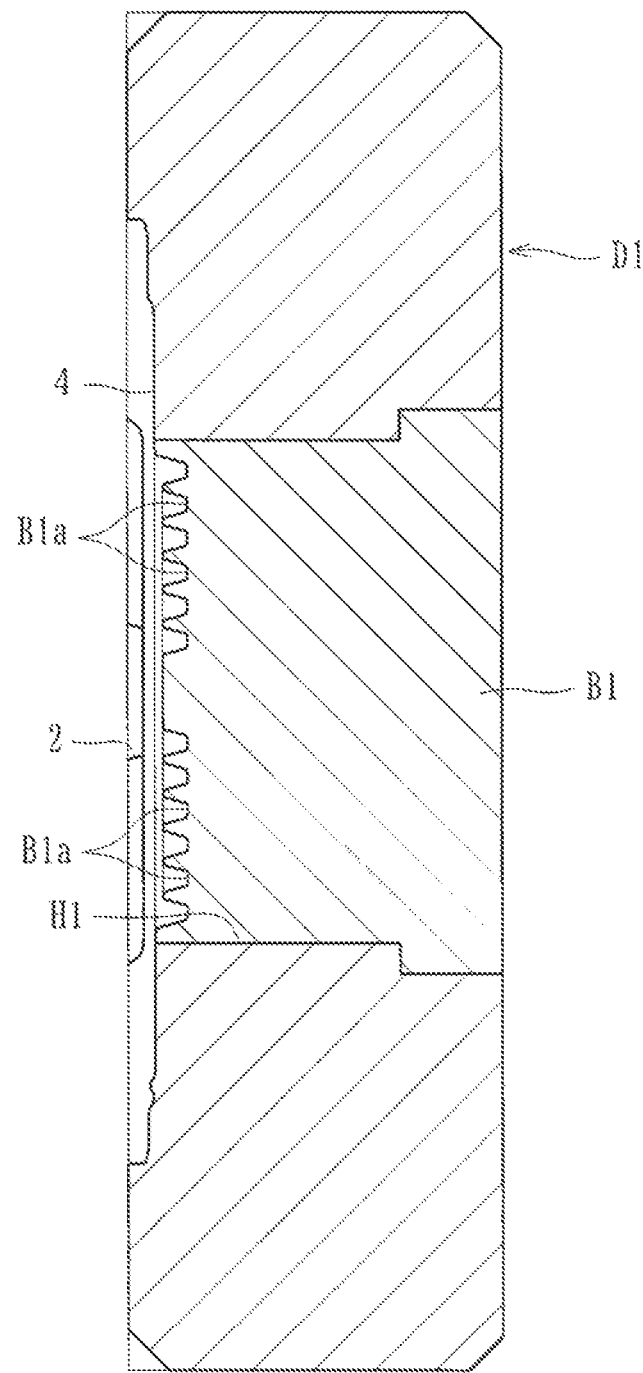

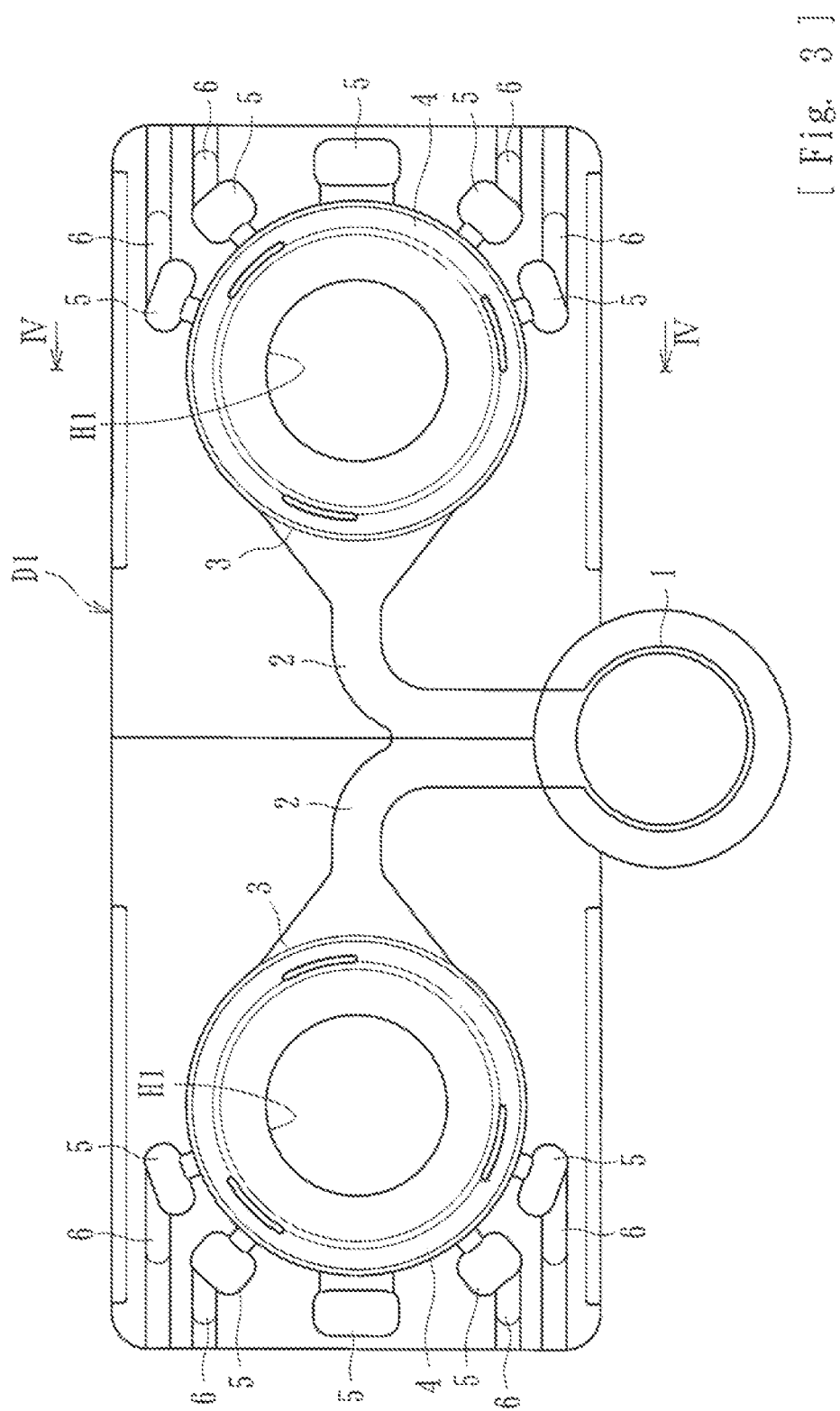
[Fig. 3]

[Fig. 4]
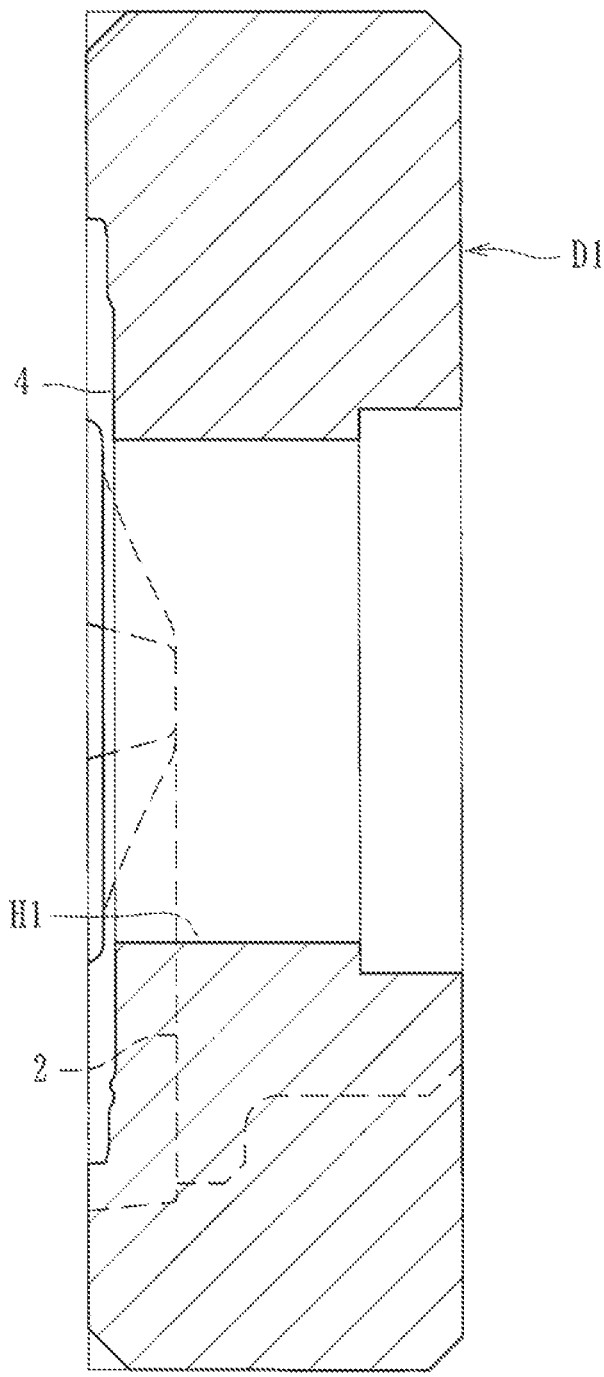

[Fig. 5]
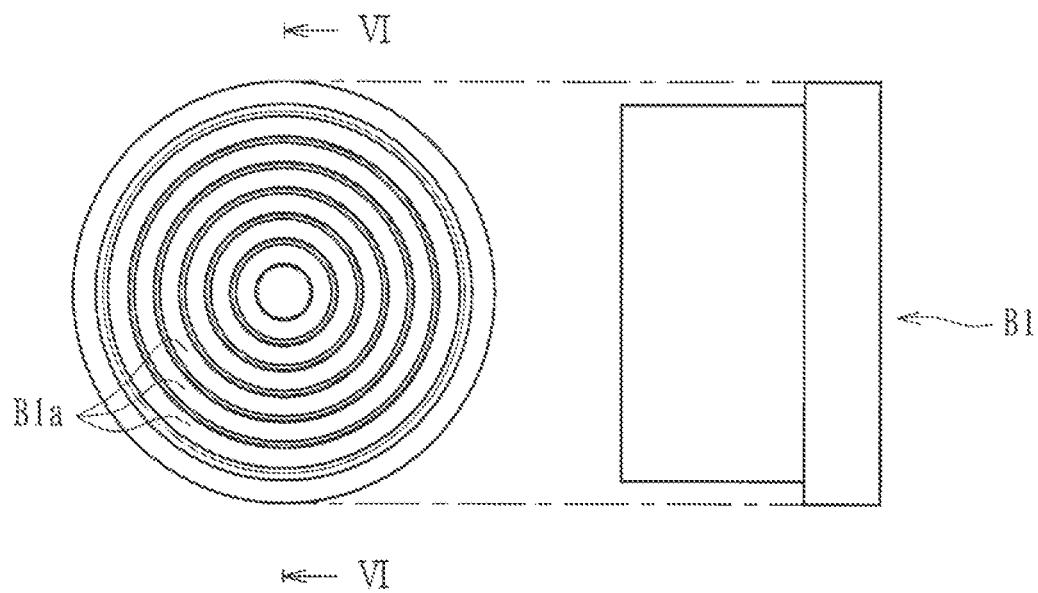
[Fig. 6]
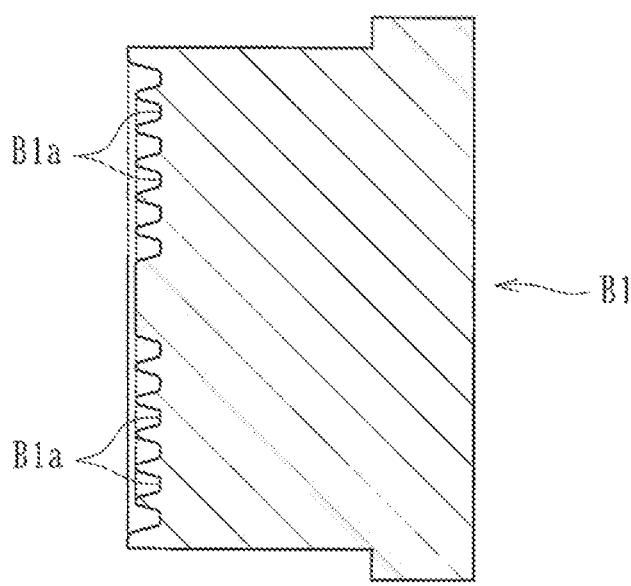

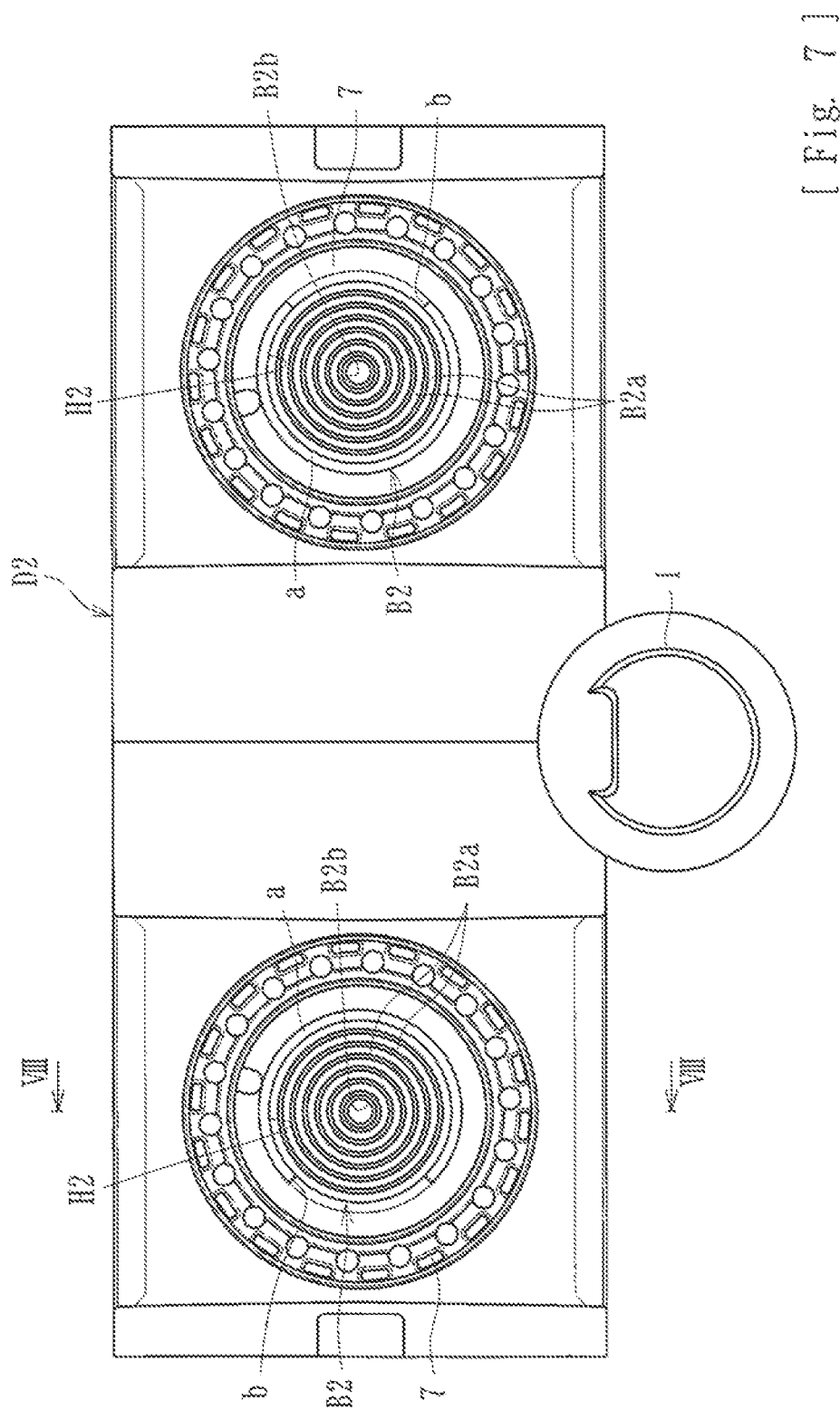
[Fig. 7]

[Fig. 8]
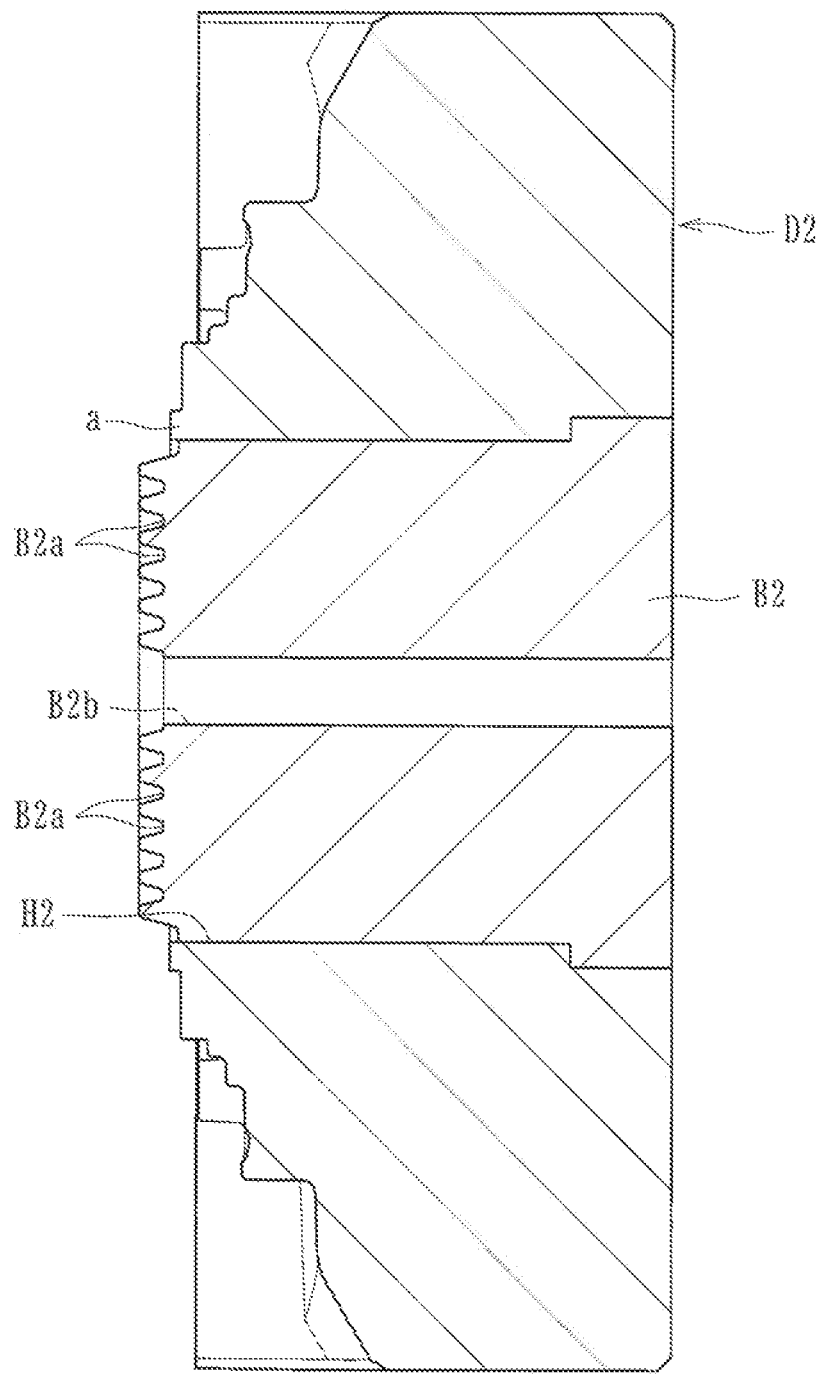

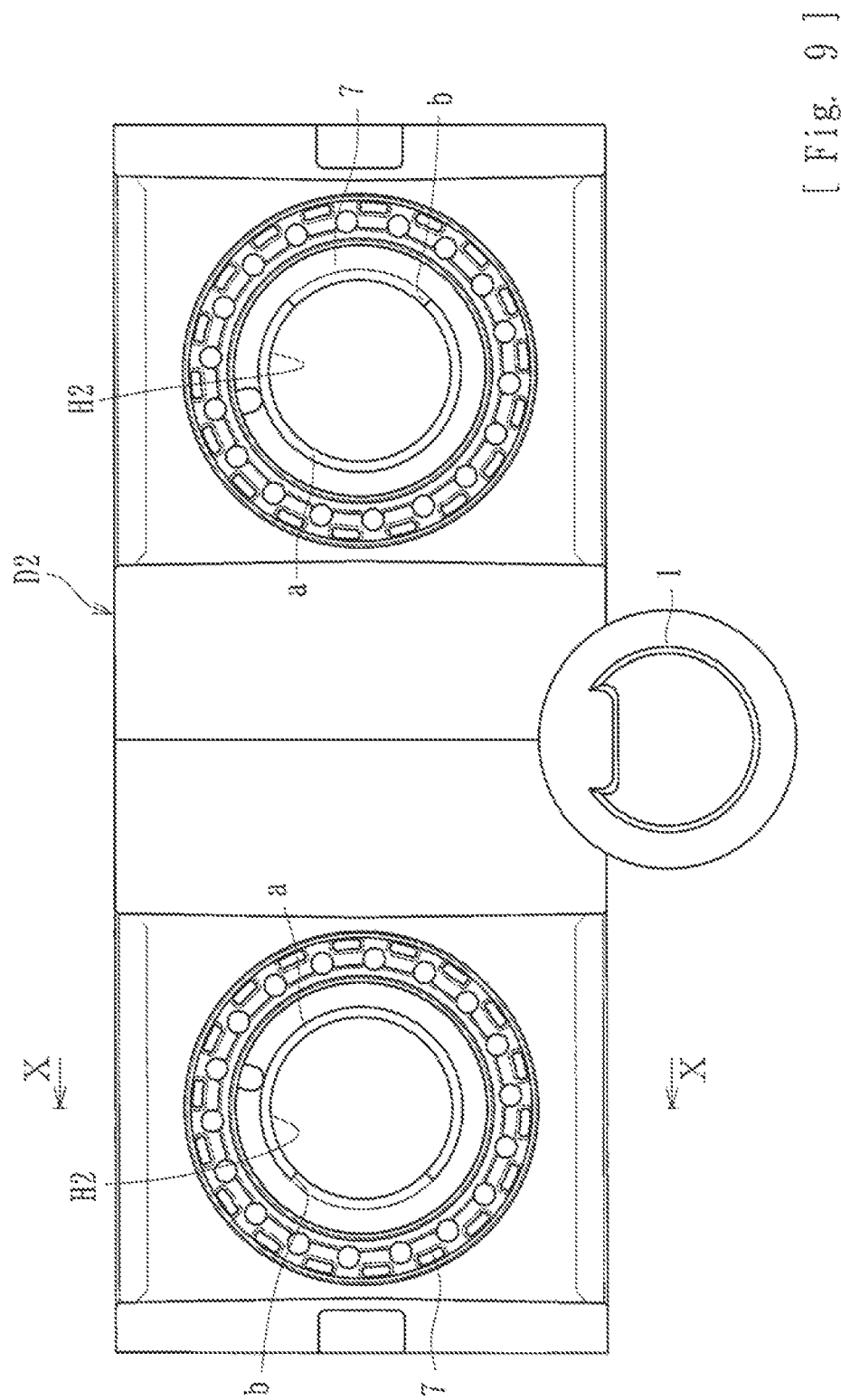

[Fig. 10]
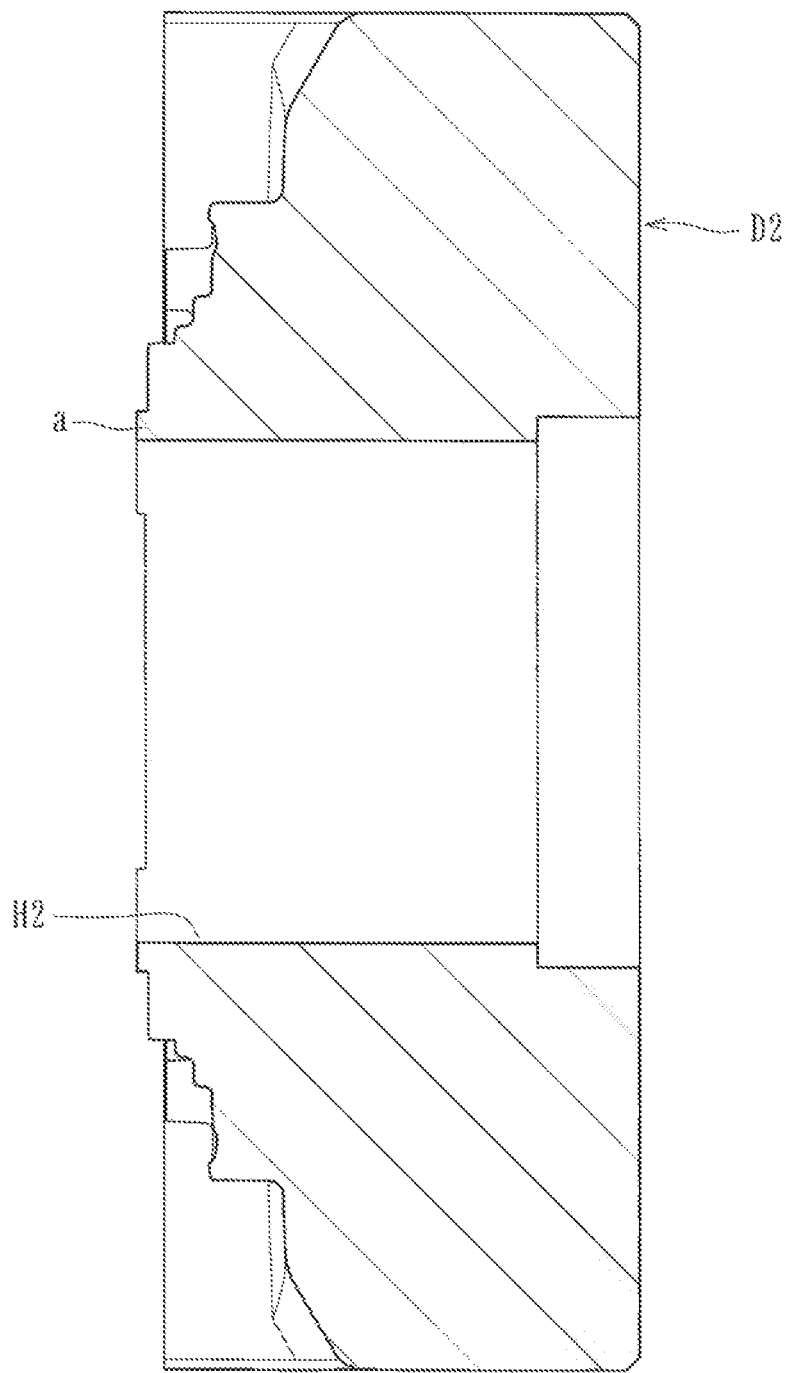

[Fig. 11]
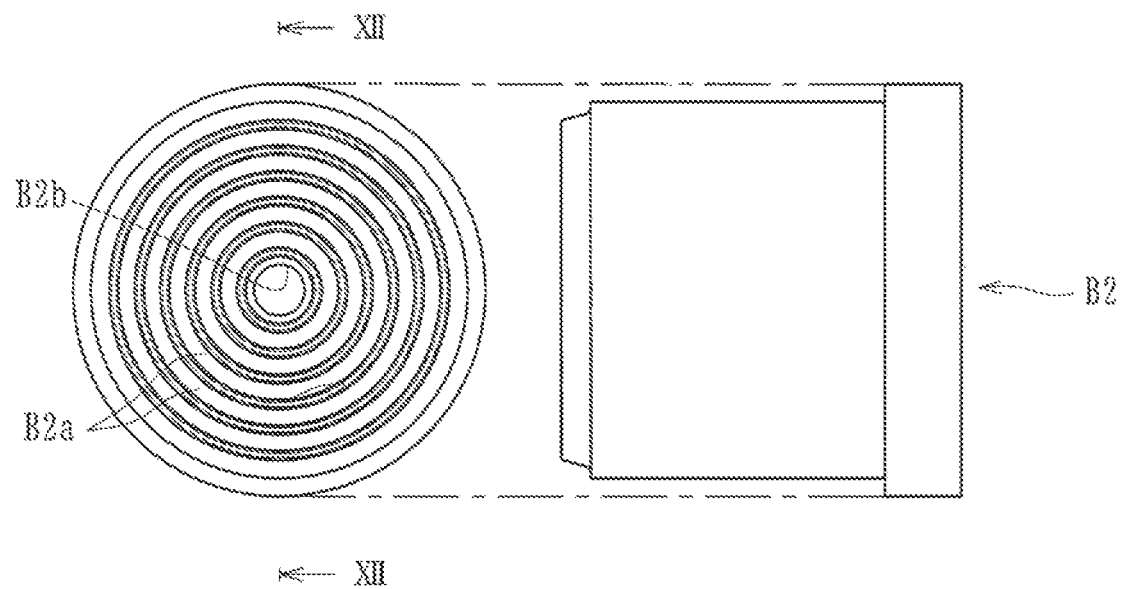
[Fig. 12]
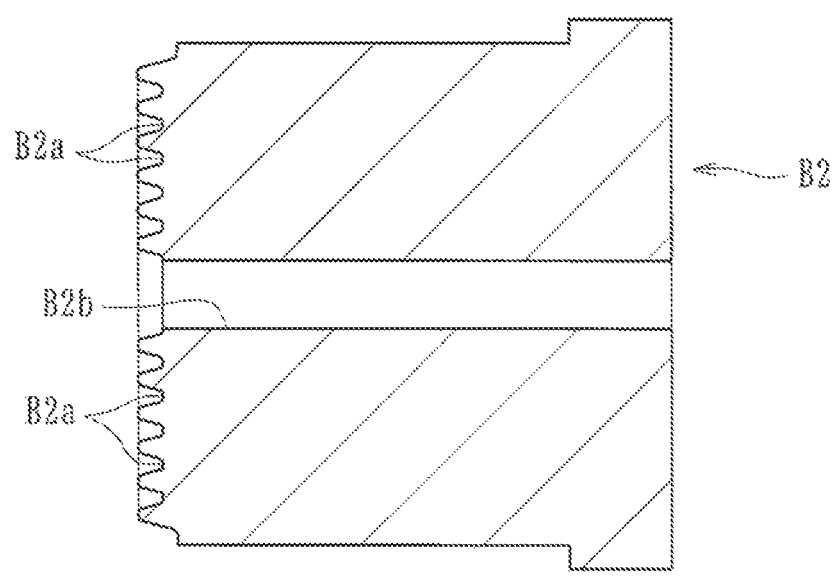

[Fig. 13]
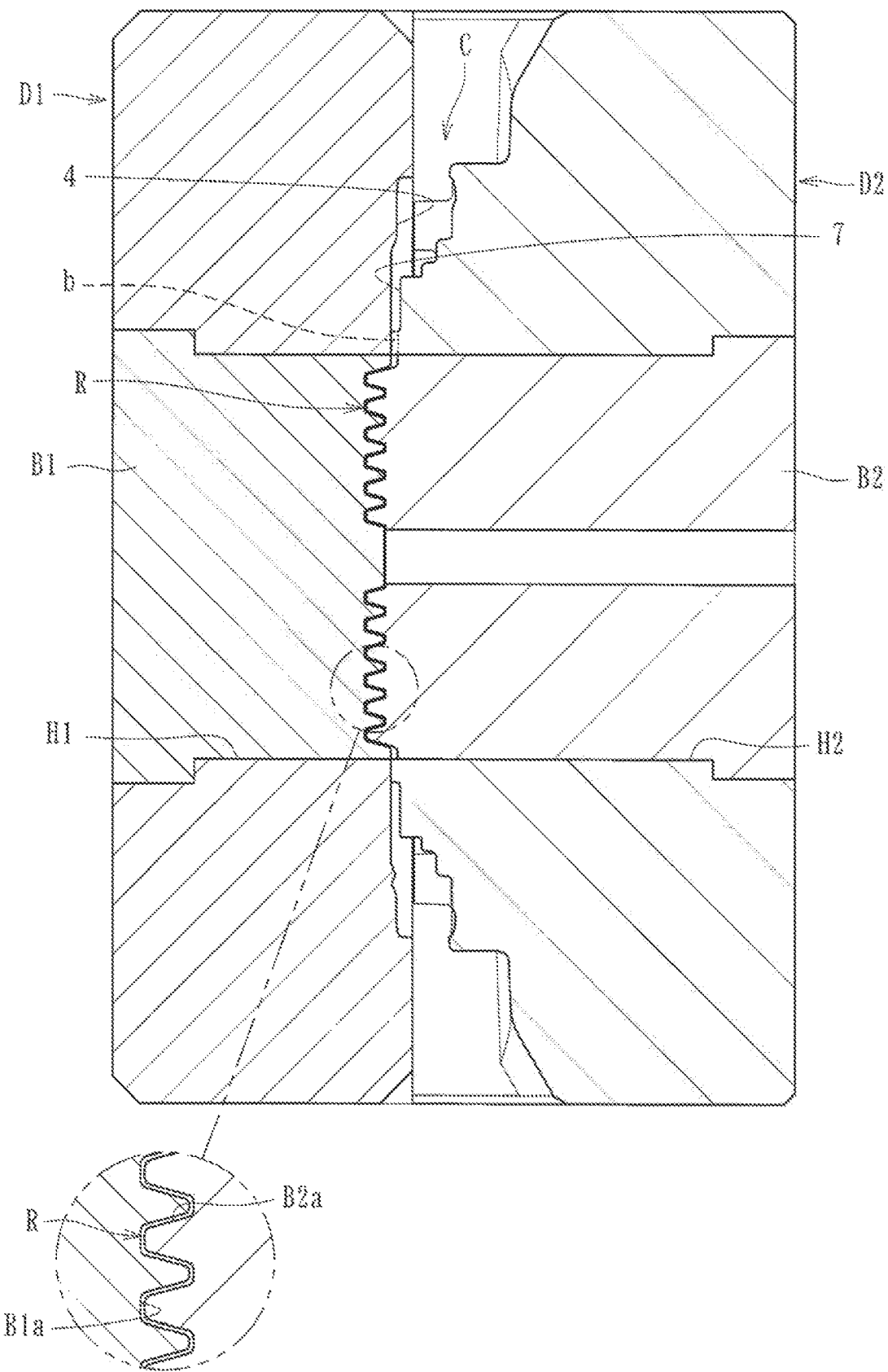

[Fig. 14]
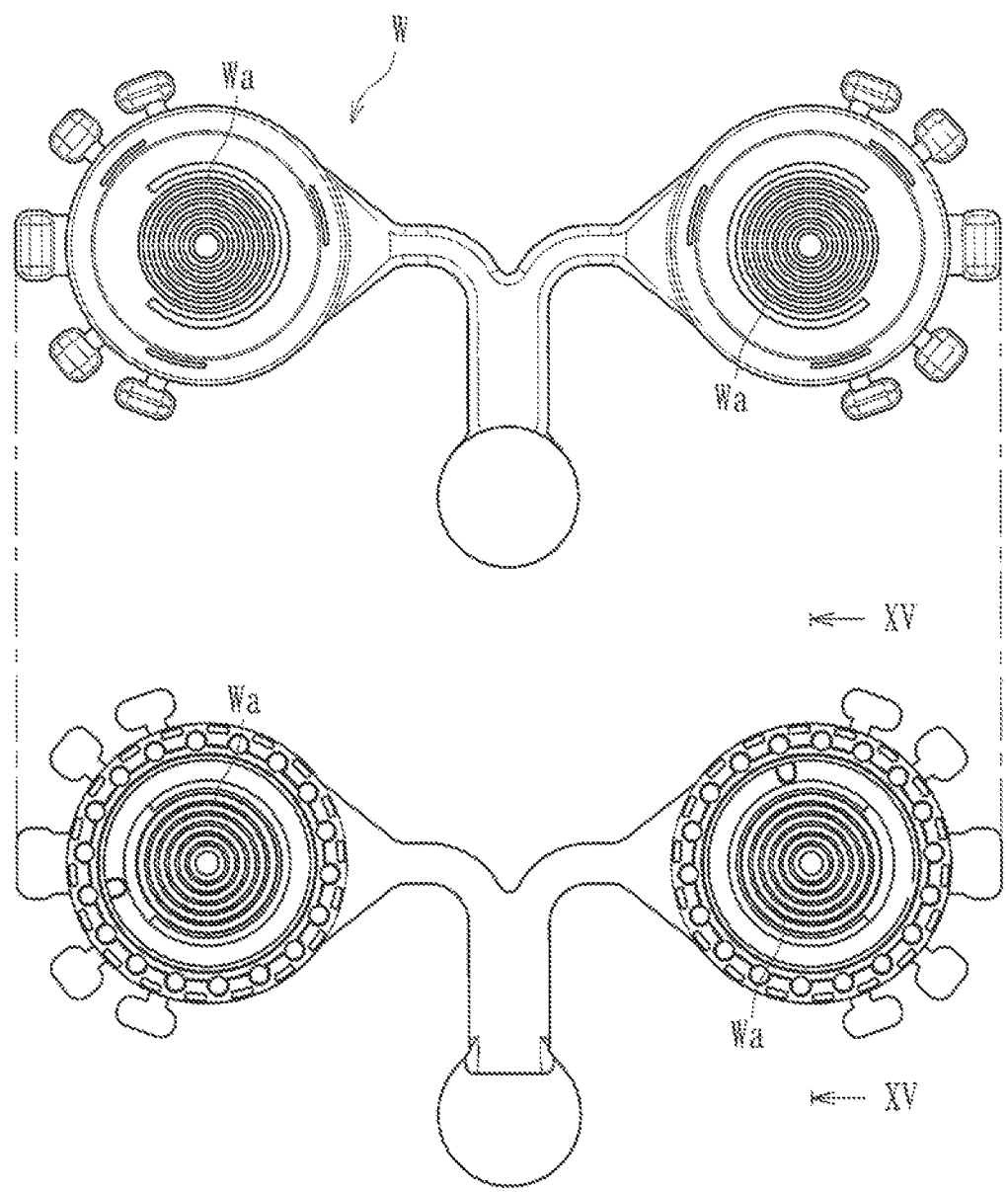

[Fig. 15]
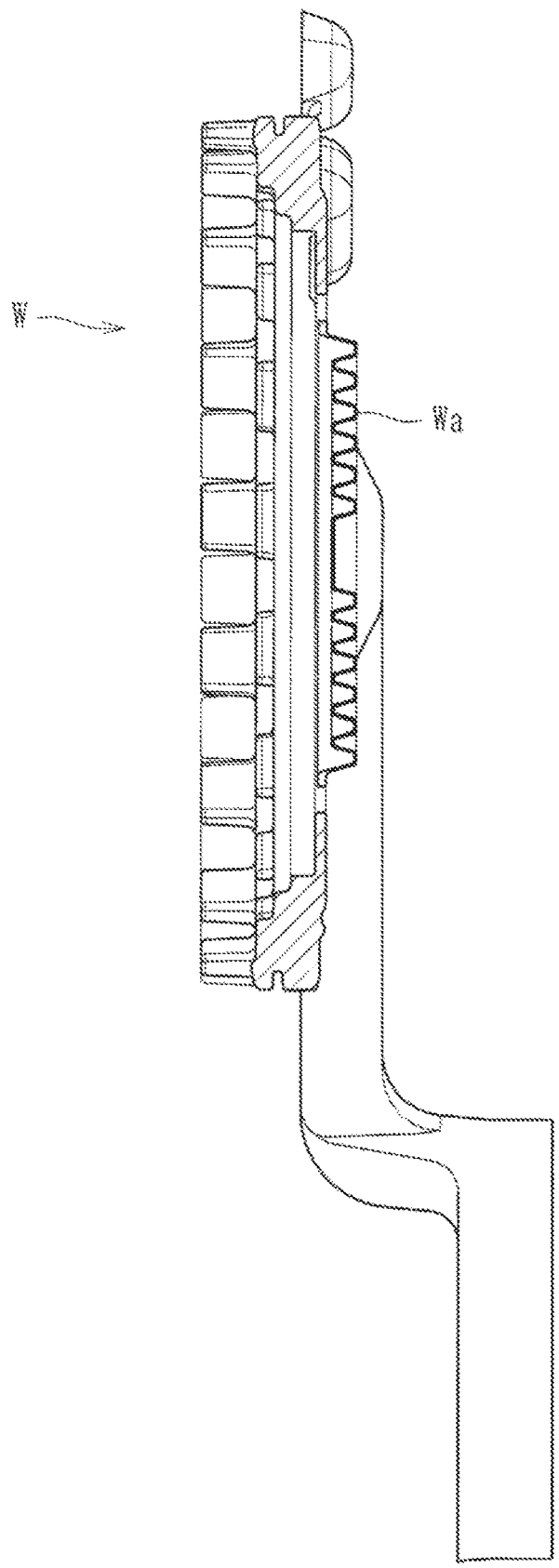

[Fig. 16]
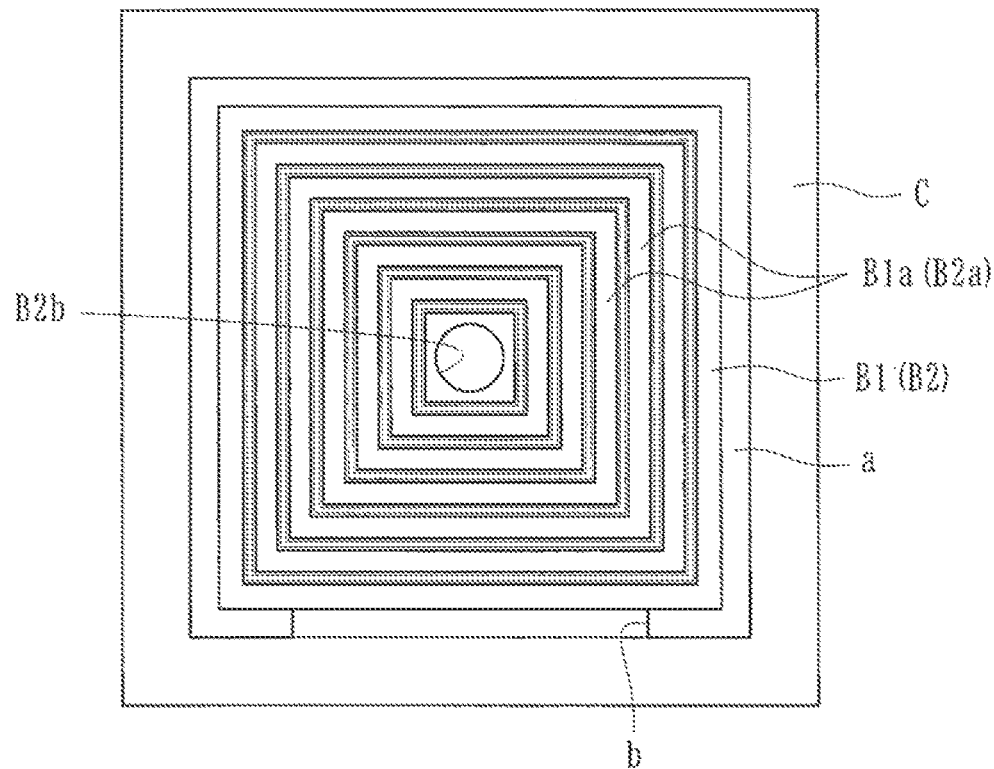
[Fig. 17]
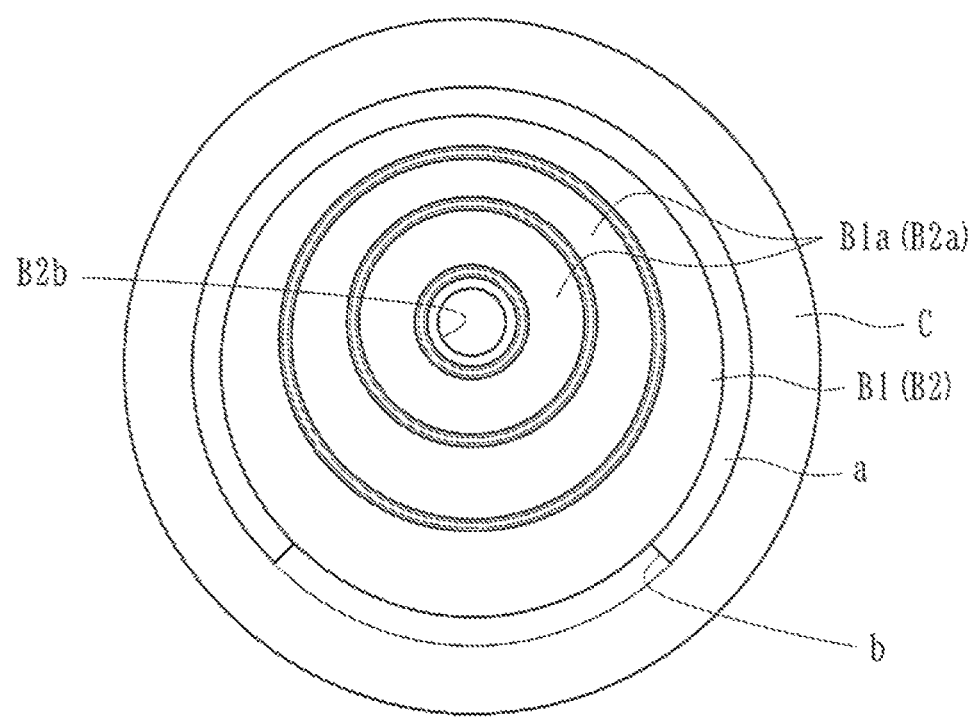

MOLDING APPARATUS AND METHOD FOR MOLDING USING SAME

CROSS-REFERENCE TO RELATED APPLICATIONS

This application is a continuation of International Application No. PCT/JP2019/039516, filed Oct. 7, 2019, which claims priority to Japanese Application No. 2018-191231, filed Oct. 9, 2018. The disclosures of the above applications are incorporating herein by reference.

FIELD

The present disclosure relates to a molding apparatus for obtaining an annular molded article by pouring a molten metal into a cavity, and a method for molding using the apparatus.

BACKGROUND

A molding apparatus (casting apparatus) has a fixed die and a movable die that approach or abut against each other to form a cavity. The apparatus is used to obtain a molded article by pouring a molten metal, such as aluminum, into the cavity. The apparatus generally includes a part that is referred to as an overflow or a vent that is capable of discharging gas, generated in the cavity, to the outside. However, there is a case where the gas generated in the cavity cannot be sufficiently discharged by the overflow or the vent. Thus, there is an apprehension that the gas remains in the molded article and becomes a blowhole.

In particular, when molding an annular molded article, since air is prone to remain inside the cavity, it has been conventionally proposed to provide a discharge hole inside the cavity. The discharge hole discharges the gas generated in the cavity (for example, refer to JP 2008-080391) to the outside. The conventional molding apparatus is provided with a block that configures a concavo-convex flow channel inside the cavity so that the gas in the cavity flows in the flow channel. The gas is thereafter discharged from the discharge hole to the outside. The gas generated in the cavity flows in the flow channel of the block and can be discharged from the discharge hole to the outside. The molten metal poured in the cavity is cooled and solidifies in the course of flowing in the flow channel and thus the molten metal can be restrained from reaching the discharge hole. (See JP 2008-080391 A).

SUMMARY

Although in the above prior art, the gas can be discharged from inside of the cavity through a flow channel formed in a block, there is a case where an area of the flow channel is insufficient to cool and solidify a molten metal. In such case, the molten metal is not cooled and solidified in the course of flowing in the flow channel. Thus, there is an apprehension that the molten metal reaches the discharge hole and it is cooled and solidified inside the discharge hole, which, in turn, obstructs the discharge hole.

The present disclosure has been made in view of such circumstances. The present disclosure aims to provide a molding apparatus capable of smoothly and sufficiently discharging the gas generated in a cavity, via a discharge hole, to the outside. The present disclosure is capable of restraining a molten metal from reaching the discharge hole. Also, it provides a method for molding using the molding apparatus.

According to the disclosure, a molding apparatus for obtaining an annular molded article by pouring a molten metal in a cavity, comprises a first molding die and a second molding die capable of forming an annular cavity. A first block and a second block are formed inside the cavity in the first and second molding dies. The first block and the second block are capable of forming a flow channel communicating with the cavity. Thus, the gas generated in the cavity and a molten metal can flow through the flow channel. A discharge hole is formed in at least one of the first and second blocks. The discharge hole is capable of discharging the gas flowing in the flow channel to the outside. In the first and second blocks, a forming surface of the flow channel is formed in an outer circumferential shape following an inner circumferential shape of the cavity.

According to the disclosure, the molding apparatus in the first and second molding dies, has penetration parts following the inner circumferential shape of the cavity that are respectively formed inside the cavity. The first block and the second block are arranged in the penetration parts.

According to the disclosure, the molding apparatus, in the first and second blocks, has formed grooved shapes, respectively. The grooved shapes oppose each other to thereby form the flow channel in a concavo-convex shape around the discharge hole.

According to the disclosure, the molding apparatus discharge hole is formed at a substantially central position of the first or second block. The grooved shapes are formed in a plurality around the discharge hole.

According to the disclosure, the molding apparatus has the inner circumferential shape of the cavity and the outer circumferential shape of the forming surface of the flow channel composed of a circular shape.

According to the disclosure, a method for molding uses a molding apparatus for obtaining an annular molded article by pouring a molten metal in a cavity comprises a first molding die and a second molding die capable of forming an annular cavity. A first block and a second block are formed inside the cavity in the first and second molding dies. The first block and the second block are capable of forming a flow channel communicating with the cavity. Thus, gas generated in the cavity and a molten metal can flow in the flow channel. A discharge hole is formed in at least one of the first and second blocks. The discharge hole is capable of discharging the gas flowing in the flow channel to the outside. The first and second blocks include a forming surface of the flow channel formed in an outer circumferential shape following an inner circumferential shape of the cavity, and the gas generated in the cavity is passed through the flow channel and then is discharged from the discharge hole to the outside.

According to the disclosure, the method for molding, in the first and second molding dies have penetration parts following the inner circumferential shape of the cavity, respectively, formed inside the cavity. The first block and the second block are arranged in the penetration parts.

According to the disclosure, the method for molding using a molding apparatus, first and second blocks, have formed grooved shapes, respectively. The grooved shapes oppose each other to form the flow channel with a concavo-convex shape around the discharge hole.

According to the disclosure, the method for molding using a molding apparatus has the discharge hole formed at a substantially central position of the first or second block. The grooved shapes are formed in plurality around the discharge hole.

According to the disclosure, the method for molding using a molding apparatus has the inner circumferential shape of the cavity and the outer circumferential shape of the forming surface of the flow channel composed of a circular shape.

According to the disclosure, in the first block and the second block, the forming surface of the flow channel is formed in an outer circumferential shape following an inner circumferential shape of cavity. Thus, most of the region inside the cavity can be utilized as a flow channel. Accordingly, gas generated in the cavity can be smoothly and sufficiently discharged, via the discharge hole, to the outside. The molten metal can be restrained from reaching the discharge hole.

According to the disclosure, in the first molding die and the second molding die, the penetration parts, following the inner circumferential shape of the cavity, are respectively formed inside the cavity. The first block and the second block are arranged in the penetration parts. Thus, the first and second blocks can be easily arranged relative to the first and second molding dies.

According to the disclosure, in the first block and the second block, grooved shapes are formed, respectively. The grooved shapes oppose each other to form a concavo-convex flow channel around the discharge hole. Thus, an area of the flow channel extending from the cavity to the discharge hole can be made larger. Accordingly, the molten metal can be reliably prevented from reaching the discharge hole.

According to the disclosure, the discharge hole is formed at a substantially central position of the first or second block. The grooved shapes are formed in a plurality around the discharge hole. Thus, the forming surface of the flow channel of the first or second block can be more efficiently utilized.

According to the disclosure, the inner circumferential shape of the cavity and the outer circumferential shape of the forming surface of the flow channel are composed of a circular shape. Thus, the strength of a burr cooled and solidified in the flow channel can be improved. Releasability can be improved, and the burr can be removed altogether.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 is a plan view of a fixed die as a first molding die of a molding apparatus according to an embodiment of the present disclosure;

FIG. 2 is a sectional view taken along the line II-II in FIG. 1;

FIG. 3 is a plan view of a state where a first block in the fixed die is removed;

FIG. 4 is a sectional view taken along the line IV-IV in FIG. 3;

FIG. 5 is a plan view and a side view of the first block mounted in the fixed die;

FIG. 6 is a sectional view taken along the line VI-VI in FIG. 5;

FIG. 7 is a plan view of a movable die as a second molding die of the molding apparatus;

FIG. 8 is a sectional view taken along the line VIII-VIII in FIG. 7;

FIG. 9 is a plan view where a second block in the movable die is removed;

FIG. 10 is a sectional view taken along the line X-X in FIG. 9;

FIG. 11 is a plan view and a side view of the second block mounted in the movable die;

FIG. 12 is a sectional view taken along the line XII-XII in FIG. 11;

FIG. 13 is a schematic sectional view of a cavity formed by the fixed die and the movable die and a flow channel formed by the first and second blocks;

FIG. 14 is a front plan view and a rear plan view of a molded article molded by the molding apparatus;

FIG. 15 is a sectional view taken along the line XV-XV in FIG. 14;

FIG. 16 is a schematic plan view of a molding apparatus according to another embodiment; and FIG. 17 is a schematic view showing a molding apparatus according to a further embodiment of the present disclosure.

DETAILED DESCRIPTION

Hereinafter, an embodiment of the present disclosure will be specifically described with reference to the drawings. A molding apparatus according to the present disclosure includes a casting apparatus for obtaining an annular molded article (annular casted article) by pouring a molten metal, such as a molten aluminum into a cavity. As shown in FIGS. 1 to 13, the molding apparatus includes a fixed die D1 (first molding die) and a movable die D2 (second molding die). A first block B1 (fixed insert) is mounted in the fixed die D1 and a second block B2 (movable insert) is mounted in the movable die D2.

The fixed and movable dies D1 and D2 are composed of dies for molding a plurality of same kind of articles (for molding simultaneously a plurality of (two in the present embodiment) same kind of molded articles. These fixed and movable dies D1 and D2 match each other to be able to form a plurality of cavities C (refer to FIG. 13) where the shape of an annular molded article W (refer to FIGS. 14 and 15) is formed. The fixed and movable dies D1 and D2 are not limited to those capable of molding a plurality of same kind of articles, and may be those capable of forming one same kind of cavity C, those capable of forming a plurality of different kinds of cavities C, or those capable of forming one different kind of cavity C.

The fixed die D1, as shown in FIGS. 1 to 4, includes a die formed with a biscuit 1, a runner 2, a gate 3, a product part 4, an overflow 5, and an air vent 6. The product part 4 of the fixed die D1 and a product part 7 of the movable die D2 match each other so that a cavity C is formed. Inside the cavity C (product part 4) in the fixed die D1, a penetration part H1 (through hole) is formed in the shape and size following an inner circumferential shape (circular shape) of the cavity C. The first block B1 is inserted and mounted in the penetration part H1.

The movable die D2, as shown in FIGS. 7 to 10, includes of a die where the product part 7 is formed. The product part 4 of the fixed die D1 and the product part 7 of the movable die D2 match each other so that a cavity C is formed. Inside the cavity C (product part 7) in the movable die D2, a penetration part H2 (through hole) is formed in the shape and size following the inner circumferential shape (circular shape) of the cavity C. The second block B2 is inserted and mounted in the penetration part H2.

The first and second blocks B1 and B2, as described above, include a cylindrical member formed inside (inner diameter side of) the cavity C in the fixed and movable dies D1 and D2. These first and second blocks B1 and B2 are respectively inserted into the penetration parts H1 and H2 and are configured so that grooved shapes B1a and B2a, formed on each tip end face, oppose each other. The grooved shapes B1a and B2a oppose each other so as to be able to form a flow channel R communicating with the cavity C, as shown in FIG. 13.

Specifically, on a forming surface (tip end face) of the flow channel R of the first block B1, as shown in FIGS. 5 and 6, a plurality of grooved shapes B1a composed of concave parts are concentrically formed in a plurality. On a forming surface (tip end face) of the flow channel R of the second block B2, as shown in FIGS. 11 and 12, a plurality of grooved shapes B2a including concave parts, are concentrically formed in a plurality. As shown in FIG. 13, when a cavity C is formed by the fixed and movable dies D1 and D2, a concavo-convex flow channel R is formed by the first and second blocks B1 and B2. The flow channel R allows the gas generated in the cavity C and a molten metal to flow.

Further, in the second block B2, as shown in FIGS. 8, 11, and 12, a discharge hole B2b is formed and opened at a substantial center of the forming surface of the flow channel R. The discharge hole B2b is formed at a substantially central position of the tip end face of the second block B2, forming a surface of the flow channel R. Also it extends in an axial direction of the second block B2. Thus, the gas flowing in the flow channel R can be discharged to the outside. Specifically the discharge hole B2b is formed at the substantially central position of the second block B2. The grooved shapes B2a are formed in a plurality around the discharge hole B2b.

The discharge hole B2b is formed at the substantially central position of the tip end face of the second block B2 forming a surface of the flow channel R. The grooved shapes B2a are concentrically formed in a plurality about an opening of the discharge hole B2b. Whereby, the molten metal poured from the cavity C is cooled and solidified in the course of flowing in the flow channel R including the grooved shapes B1a and B2a. The gas generated in the cavity C is discharged from the discharge hole B2b to the outside. Although the discharge hole B2b according to the present embodiment is formed in the second block B2, this hole may be formed in the first block B1 or may be formed in both of the first and second blocks B1 and B2.

On the other hand, in the movable die D2, a circular-arc shaped convex part (a) is formed at a boundary between the product part 7 and the penetration part H2, and a part of the convex part is a cutout (b). The convex part (a) is positioned on the side of the gate 3 to partition the cavity C and the flow channel R. The cutout (b) is positioned on an opposite side (far side) of the gate 3 so that the cavity C and the flow channel R communicate with each other. Thus, the molten metal poured in the cavity C flows along the annular cavity C and then flows towards the flow channel R at the far position relative to the gate 3 (position of cutout b), as indicated by arrows in FIG. 1.

In the first and second blocks B1 and B2 according to the present embodiment, the forming surface of the flow channel R (opposing tip end faces) is formed in an outer circumferential shape following the inner circumferential shape of the cavity C (circular shape in the present embodiment). More specifically, in the fixed die D1 (first molding die) and the movable die D2 (second molding die), the penetration parts (H1 and H2), following the inner circumferential shape of the cavity C (circular shape), are respectively formed inside the cavity C. The first and second blocks B1 and B2 are arranged in the penetration parts (H1 and H2). The outer circumferential shape of the first and second blocks B1 and B2 is formed following the inner circumferential shape of the penetration parts (H1 and H2), that is, the inner circumferential shape of the cavity C.

Hence, the flow channel R can be formed substantially throughout the entire region over a part inside the cavity C. An area of the flow channel R can be maximally defined by utilizing a penetration part at the center of an annular molded article. Thus, the molten metal flowing in the flow channel R from the cavity C is cooled and solidified in the course of flowing in the flow channel R which is comparatively long in size. The molten metal can be restrained from reaching the discharge hole B2b. In particular, in the present embodiment, since a plurality of annular grooved shapes B2a (concavo-convex flow channel R) are formed around the discharge hole B2b, the molten metal flows successively from the outer grooved shape B2a to the inner grooved shape B2a. Thus, the molten metal can be more reliably restrained from reaching the discharge hole B2b at the central position.

By the molding apparatus (casting apparatus) according to the present embodiment, as shown in FIGS. 14 and 15, a molded article W (casted article) having a burr Wa can be obtained. The burr Wa is composed of a part cooled and solidified in the course of flowing in the flow channel R. After removal from the casting apparatus, the burr Wa is trimmed in the same way as other burrs by, for example, trimming equipment so that an annular product can be obtained.

According to the above embodiment, in the first and second blocks B1 and B2, the forming surface of the flow channel R is formed in the outer circumferential shape (circular shape) which follows the inner circumferential shape of the cavity C. Thus, most of the region inside the cavity C can be utilized as a flow channel R. The gas generated in the cavity C can be smoothly and sufficiently discharged outside via the discharge hole B2b to the outside. The molten metal can be restrained from reaching the discharge hole B2b.

In addition, in the fixed die D1 (first molding die) and the movable die D2 (second molding die) according to the present embodiment, the penetration parts (H1 and H2) following the inner circumferential shape of the cavity C are respectively formed inside the cavity C. The first and second blocks B1 and B2 are arranged in the penetration parts (H1 and H2). The first and second blocks B1 and B2 can be easily arranged relative to the fixed die D1 (first molding die) and the movable die D2 (second molding die).

Further, in the first and second blocks B1 and B2, according to the present embodiment, grooved shapes (B1a and B2a) are respectively formed. The grooved shapes (B1a and B2a) oppose each other to form a concavo-convex flow channel R around the discharge hole B2b. Thus, an area of the flow channel R extending from the cavity C to the discharge hole B2b can be made larger, and the molten metal can be more reliably prevented from reaching the discharge hole B2b.

Furthermore, the discharge hole B2b is formed at the substantially central position of the first block B1 (or second block B2). The grooved shapes (B1a and B2a) are formed in a plurality around the discharge hole B2b and thus, the forming surface of the flow channel in the first block B1 or the second block B2 can be more efficiently utilized. Moreover, in the present embodiment, since the inner circumferential shape of the cavity C and the outer circumferential shape of the forming surface of the flow channel R (the outer circumferential shape of the tip end faces of the first block B1 and the second block B2) include a circular shape, the strength of the burr Wa (refer to FIGS. 14 and 15) cooled and solidified in the flow channel R can be improved, releasability can be improved, and the burr can be removed altogether.

Although the present embodiment has been described above, the present disclosure is not limited thereto. It is sufficient if the forming surface of the flow channel R in the first and second blocks B1 and B2 is formed in the outer circumferential shape following the inner circumferential shape of the annular cavity C. As shown in FIG. 16 for example, the inner circumferential shape of the annular cavity C may be formed in a rectangular shape. The forming surface of the flow channel R in the first and second blocks B1 and B2 may be formed in the outer circumferential shape following the rectangular shape. In addition, as shown in FIG. 17, for example, a plurality of grooved shapes B1*a* and B2*a* may have respectively different centers.

Further, although the molding apparatus according to the present embodiment is applied to a casting apparatus for obtaining a molded article by pouring a molten metal such as a molten aluminum in a cavity C, this apparatus may be applied to another molding apparatus such as an apparatus employing a molten metal obtained by melting another metal or a diecast apparatus for obtaining a molded article by pouring a molten resin material or the like in a cavity C.

The present disclosure can be applied to any molding apparatus having a different external shape or having another function, and a method for molding using the molding apparatus, as long as a forming surface of a flow channel in a first block and a second block is formed in an outer circumferential shape following an inner circumferential shape of a cavity.

The present disclosure has been described with reference to the preferred embodiment. Obviously, modifications and alternations will occur to those of ordinary skill in the art upon reading and understanding the preceding detailed description. It is intended that the present disclosure be construed to include all such alternations and modifications insofar as they come within the scope of the appended claims or their equivalents.

What is claimed is:

1. A molding apparatus for obtaining an annular molded article by pouring a molten metal in a cavity, comprising:
    a first molding die and a second molding die configured to form an annular casting cavity;
    a first block and a second block formed and positioned radially inward relative to the annular casting cavity axially along an axis of the annular casting cavity within the first and second molding dies, respectively, the first block and the second block configured to form a flow channel communicating with the annular casting cavity so that gas generated in the annular casting cavity and a molten metal flow in the flow channel;
    a discharge hole is formed in at least one of the first and second blocks, the discharge hole is capable of discharging the gas flowing in the flow channel directly to ambient; and
    a forming surface of the flow channel in the first and second blocks is formed in an outer circumferential shape that follows from or succeeds an inner circumferential shape of the casting cavity.

2. The molding apparatus according to claim 1, wherein, in the first and second molding dies, penetration parts, following the inner circumferential shape of the cavity, are respectively formed inside the cavity, and the first and second blocks are arranged in the penetration parts.

3. The molding apparatus according to claim 1, wherein, in the first and second blocks, grooved shapes are respectively formed, and the grooved shapes oppose each other to form the flow channel in a concavo-convex shape around the discharge hole.

4. The molding apparatus according to claim 3, wherein the discharge hole is formed at a substantially central position of the first or second block, and the grooved shapes are formed in a plurality around the discharge hole.

5. The molding apparatus according to claim 1, wherein an inner circumferential shape of the cavity and an outer circumferential shape of the forming surface of the flow channel are composed of a circular shape.

6. A method for molding using a molding apparatus for obtaining an annular molded article by pouring a molten metal in a cavity, the molding method comprising:
    providing a first molding die and a second molding die;
    configuring the first molding die and second molding die to form an annular cavity;
    providing a first block and a second block formed and positioned radially inward relative to the annular cavity axially along an axis of the annular casting cavity within the first molding die and second molding die;
    configuring the first block and second block to form a flow channel communicating with the annular casting cavity so that gas generated in the annular casting cavity and a molten metal flow in the flow channel;
    forming a discharge hole in at least one of the first and second blocks;
    discharging the gas flowing in the flow channel directly to ambient through the discharge hole; and,
    forming a forming surface of the flow channel in the first and second blocks in an outer circumferential shape that follows from or succeeds an inner circumferential shape of the casting cavity; and
    passing the gas generated in the cavity through the flow channel and then discharging it to ambient from the discharge hole.

7. The method for molding using a molding apparatus according to claim 6, wherein, in the first and second molding dies, penetration parts, following the inner circumferential shape of the cavity, are respectively formed inside the cavity, and the first and second blocks are arranged in the penetration parts.

8. The method for molding using a molding apparatus according to claim 6, wherein, in the first and second blocks, grooved shapes are respectively formed, and the grooved shapes oppose each other to thereby form the flow channel in a concavo-convex shape around the discharge hole.

9. The method for molding using a molding apparatus according to claim 8, wherein the discharge hole is formed at a substantially central position of the first or second block, and the grooved shapes are formed in a plurality around the discharge hole.

10. The method for molding using a molding apparatus according to claim 6, wherein an inner circumferential shape of the cavity and an outer circumferential shape of the forming surface of the flow channel are composed of a circular shape.

* * * * *